Feb. 22, 1949.    M. A. BILOFSKY    2,462,713
FILM HOLDER
Filed June 7, 1947
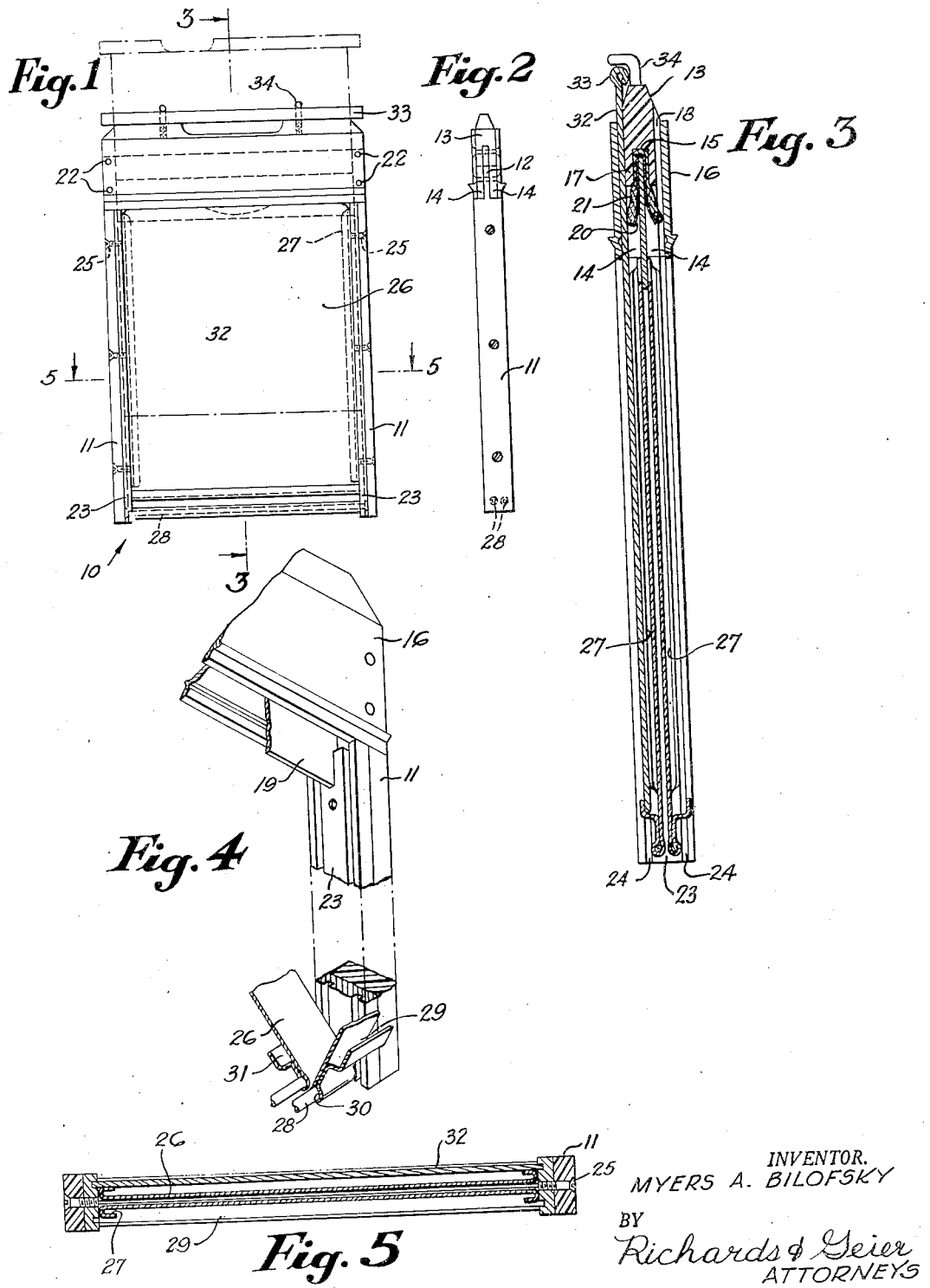
INVENTOR.
MYERS A. BILOFSKY
BY
Richards & Geier
ATTORNEYS Patented Feb. 22, 1949

2,462,713

UNITED STATES PATENT OFFICE 2,462,713

FILM HOLDER

Myers A. Bilofsky, Loch Arbour N. J.

Application June 7, 1947, Serial No. 753,323

1 Claim. (Cl. 95—66)

This invention relates to film holders and more particularly to sheet or plate film holders for carrying such film and inserting the same into a sheet film or plate camera.

Heretofore, in sheet or plate film holders with which I am familiar, it was necessary to handle the sheet or plate when inserting it into the holder prior to exposure, and after exposure when removing the sheet or plate from the holder. The construction of these prior art devices requires great care in order to avoid marring the highly sensitive film or plate when inserting or removing same therefrom.

Thus, one object of the present invention is the provision of such a device the construction of which facilitates the ready insertion and removal of a film or plate therefrom.

Another object is the provision of such a device having light valve means of highly simplified construction combined with a stop plate for the swingable retainer plates.

Still another object is the provision of such device of simple yet sturdy construction which may be manufactured at relatively low cost.

Other objects and novel features will appear as the nature of the invention is better understood, the invention consisting in the novel arrangement and co-relation of parts herein fully described, and illustrated in the accompanying drawings, wherein similar reference characters are used to denote corresponding parts throughout the several views, and then finally pointed out and specifically defined and indicated in the appended claim.

The disclosure made for the basis of exemplifying the present invention concept suggests a practical embodiment thereof, but the invention is not to be restricted to the exact details of this disclosure, and the latter, thereof, is to be understood from an illustrative, rather than a restrictive standpoint.

In carrying out an embodiment of the device it was found advantageous to provide a frame having a pair of covers or dark slides adapted to be withdrawn from an end of the holder and mounted spaced outwardly of each retainer plate, in combination with a stop plate having light valve means on its upper end and mounted in the under surface of an upper cross member of the holder frame.

In the drawings:

Figure 1 is a front elevational view of a device constructed in accordance with the present invention;

Figure 2 is a side elevation of the same;

Figure 3 is a sectional view of Figure 1 along the line 3—3 on an enlarged scale;

Figure 4 is a fragmentary perspective view on an enlarged scale of an upper and lower corner of the device;

Figure 5 is a sectional view of Figure 1 on the line 5—5, on an enlarged scale.

Referring now to the drawings in detail a film holder 10 has two side members 11 having substantially narrow elongated end portions 12. A cross member 13 has fingers 14 at either side (Figure 2) grooved to receive elongated end portions 12 of side members 11. Cross member 13 has a longitudinal groove formed in its under surface as at 15 (Figure 3) which inter-connects the two grooves formed by the two pairs of fingers 14. A pair of cross-panels 16 are of such thickness as to nest with side members 11 and over fingers 14 of cross member 13 as clearly shown in Figures 1 to 4. When mounted one on either side of the device, cross-panels 16 are outwardly spaced by fingers 14 from the central transverse portion 17 or cross member 13 so as to form slots 18 therebetween.

A stop plate 19 carrying over one longitudinal edge spring-like member 20 outwardly covered as by felt 21 or the like, is adapted to seat in groove 15 with said spring 20 flaring outwardly from said stop plate 19 toward the bottom edge thereof (Figure 3).

Cross panels 16, fingers 14 and elongated portions 12 may be bored so that they may be maintained in place as by rivets 22 inter-connecting the same. Further, side members 11 and cross member 13 may be made of suitable synthetic resins such as Bakelite.

Side members 11 may be reinforced as by inner side members 23 made of suitable metal and which have a pair of grooves 24 formed therein in alinement with the slots 18. An inner side member 23 may be secured to each side member 11 on the inner surface thereof as by screws 25.

Retainer plates 26 having their longitudinal edges bent over to form elongated lips 27 may be swingably mounted between inner side members 23 by means of hinge pins, the ends of which are seated in the inner side members 23 of intermediate grooves 24 and adjacent the lower ends of said inner side members. Retainer plates 26 have their lower edges 29 turned over so as to form substantially closed cylindrical slots 30 by means of which retainer plates 26 are swingably mounted about said pins 28. A short distance from slots 30 lower edges 29 of the retainer plates are flared outwardly to form grooves 31. When the retainer plates 26 are in their closed position they abut at their upper ends stop plate 19 and are positioned inwardly of grooves 24.

A cover, or dark slide 32, is adapted to be inserted and withdrawn from the upper end of holder 10 through slots 18 and grooves 24. In Figures 1 and 3 is seen one dark slide 32 in position while the other slot 18 and groove 24 is shown unoccupied. Slide 32 may be made of fibre board or of other suitable material. To facilitate manipulation, slide 32 may be provided with a tubular end piece 33 at the upper end thereof. End pieces 33 are substantially wider than slides 32 and abut against the top of cross member 13 when the slides are in the holder.

To provide against accidental displacement of slides 32, L-shaped hook members 34 may be threaded into the upper surface of cross member 13.

To load the holder, slides 32 are removed and retainer plates 26 are swung outwardly from holder 10. Film is then inserted under lips 27 of each retainer plate which are then swung back into the holder until they abut stop plate 19. The covers or dark slides 32 are then inserted. The lower edges of both the film and the slides are received by grooves 31 at the bottom of retainer plates 26. Highly resilient spring 20 being under tension urges its felt covering outwardly against the inner surface of cross panels 16 and effectively prevents the passage of light through slots 18 while the slide is removed as during the exposure of the film when in a camera to take a picture. After the film has been exposed, to remove the film from the holder, slides 32 are removed and plates 26 are swung outwardly from the frame.

It is to be understood that the materials used in the construction of the foregoing device are impervious to light and temperature changes and do not permit infra red rays to pass therethrough.

From the foregoing, it is seen that the present invention provides a highly useful film or plate holder, the operation and construction of which are highly simplified.

It is apparent that the illustrations shown above have been given solely by way of illustration and not by way of limitation and that the above examples are subject to wide variations and modifications within the scope of the appended claim. All such variations and modifications are to be included within the scope of the present invention.

What is claimed is:

A film holder, comprising a pair of side members, a cross member inter-connecting said side members, a pair of cross panels, one on each side of said cross member and nesting with said side members, said cross member and said cross panels forming a pair of slots therebetween, an inner side member secured to the inner surface of each of said side members and in face-to-face relation one with the other, at least one retainer plate having lips formed along the longitudinal edges on one surface thereof, said retainer plate having a substantially closed cylindrical slot formed at its lower end, a hinge pin in said cylindrical slot and having its ends protruding therefrom, said ends of said hinge pin being seated in said inner side members adjacent the lower ends thereof, said holder having at least one dark slide adapted to be withdrawn from an end of the holder, said inner side members having grooves formed therein for receiving said slide, and light valve means mounted in the underside of said cross member, said retainer plate having a groove formed therein adjacent the lower edge thereof, the wall of said groove flaring outwardly to receive the bottom edge of a film and said slide within said groove.

MYERS A. BILOFSKY.

REFERENCES CITED

The following references are of record in the file of this patent:

UNITED STATES PATENTS

| Number | Name | Date |
|---|---|---|
| 315,219 | Barker | Apr. 7, 1885 |
| 476,203 | Hetherington | May 31, 1892 |
| 925,895 | Goddard | June 22, 1909 |
| 1,267,159 | Zuckerman | May 21, 1918 |